Patented Sept. 8, 1942

2,294,892

UNITED STATES PATENT OFFICE 2,294,892

DYE FOR PHOTOGRAPHIC LAYERS

Burt H. Carroll and Jonas John Chechak, Rochester, N. Y., assignors to Eastman Kodak Company, Rochester, N. Y., a corporation of New Jersey No Drawing. Application May 7, 1940, Serial No. 333,806

12 Claims. (Cl. 95—6)

This invention relates to photography and particularly to azo dyes for incorporation in photographic layers.

It is well known that dyes used in photography should remain in the layers in which they are incorporated. Many of the dyes which have been proposed for use in photographic layers either wander from the layer in which they are incorporated or if they are sufficiently non-diffusing in photographic layers cannot be bleached or removed from the layers during processing. Filter dyes, anti-halation dyes and image-forming dyes, for example, should remain in the layer in which they are incorporated until it is desired to remove them during processing of the photographic element in which they are incorporated. Many dyes hitherto used are objectionable because of the tendency to diffuse from one layer to another. Such wandering may sometimes be prevented by precipitating the dyes with organic bases although this method of rendering the dyes non-diffusing has the disadvantage of increasing the cost of preparing the dye layers and frequently makes the incorporation of a sufficient concentration of the dyes difficult owing to a tendency for the dye and the precipitate to separate out in crystals or flakes.

Azo dyes are, in general, desirable for use in coloring photographic layers because they are relatively light stable and may be decolorized by suitable treatment of the film. It has previously been thought that direct cotton dyes may be used to color photographic gelatin layers and that such dyes do not diffuse from the layers. However, we have found that this is not necessarily true in general.

It is, therefore, an object of the present invention to provide photographic layers having dyes which do not diffuse through set gelatin or which diffuse only very slightly. A further object is to provide dyes which do not desensitize emulsion layers in which they are incorporated or which are coated adjacent to the dye-containing layers. A still further object is to provide dyes for color photography which can be bleached readily in the presence of a silver image by the use of suitable bleaching agents. A still further object is to provide image-forming dyes for color photography which have the proper spectral absorption. Other objects will appear from the following description of our invention.

These objects are accomplished by the use of azo dyes made by tetrazotizing symmetrical aromatic diamines having certain substituent groups ortho to the amino groups and coupling them with β-naphthols which may or may not contain substituent groups.

These dyes are formed from symmetrical aromatic diamines containing alkyl or halogen substituents in the positions in the aromatic nuclei ortho to the amino groups. These diamine bases are tetrazotized in the usual way using any known diazotizing reaction and are then coupled with a β-naphthol. Since in a β-naphthol the position para to the hydroxyl group is substituted, the coupling takes place in the α- or 1-position of the naphthol molecule.

Aromatic diamines suitable for use in the production of the dyes which we propose to use are ortho tolidine, ortho tolidine disulfonic acid, 4,4'-diaminostilbene disulfonic acid, ortho dichlorbenzidine, 4,4'-diamino-3,3'-dimethyl-diphenylmethane, and 4,4'-diamino-3,3'-dichlorodiphenylurea. β-naphthols suitable for use in the coupling reaction are β-naphthol and β-naphthol-3,6-disulfonic acid. Amino substituted β-naphthols may also be used and the amino groups may contain acyl substituents. The acyl group may contain a straight carbon chain of from 1 to 12 carbon atoms or a branched carbon chain such as isopropyl, isobutyl and secondary or tertiary amyl. These long chain acyl groups tend to decrease diffusion of the dye.

The dyes which we contemplate using may have the following structure:

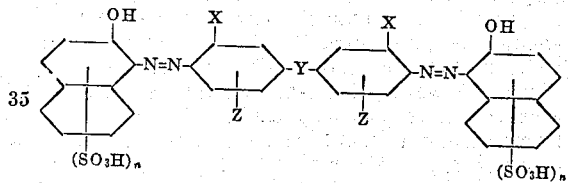

X = halogen or alkyl
Y = chemical bond
 —NH—CO—NH—
 —CH=CH—
 —(CH$_2$)$_q$— where $q$ is a positive integer
Z = hydrogen, alkyl, alkoxy, sulfonic acid, carboxylic acid
$n$ = 0, 1, or 2. If $n$ = 0, the diamine must be sulfonated In the above formula it is understood that the aryl radicals, including the β-naphthol groups, may contain other substituent groups in addition to those specifically mentioned. The dyes which we propose to use may be incorporated in filter overcoats, overcoats or interlayers in photographic films, plates or paper or they may be mixed with unsensitized or optically sensitized emulsions and employed in the preparation of multi-layer films for color processes in which the image is formed by destruction of a portion of a uniform layer of dye in the vicinity of a silver image by special treatment such as solutions of thiourea or hydrobromic acid containing catalysts.

The following examples, which are illustrative only, indicate dyes which are suitable for use according to our invention.

Example 1

The dye made by tetrazotizing 1 mol of 4,4'-diamino-3,3'-dimethyldiphenylmethane and coupling it in alkaline medium with 2 mols of β-naphthol-3,6-disulfonic acid (commonly known as R acid) has the following structure:

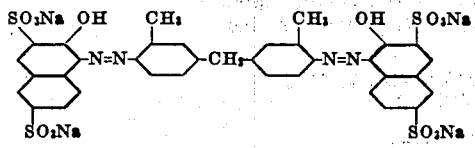

Example 2

The dye made by tetrazotizing 1 mol of 3,3'-dichlorbenzidine and coupling it in alkaline medium with 2 mols of β-naphthol-8-sulfonic acid has the following structure:

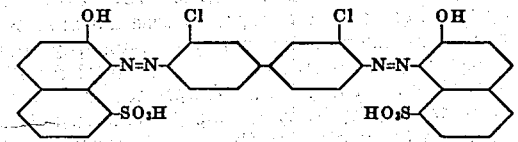

Example 3

The dye made by tetrazotizing 1 mol of 5,5'-dimethylbenzidine-2,2'-disulfonic acid and coupling it in alkaline medium with 2 mols of β-naphthol has the following structure:

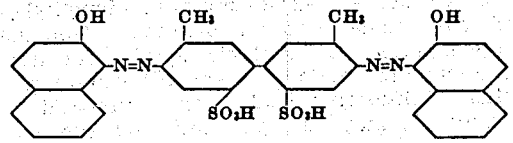

When used as image-forming dyes in sensitive photographic layers, the dyes which we have described may be used with a photographic material such as that of Christensen U. S. Patent 1,517,049, granted November 5, 1924. In the material described in the Christensen patent, the sensitive layers are uniformly colored a color complementary to that which they are designed to record. The blue-sensitive layer is colored yellow, the green-sensitive layer is colored magenta and the red-sensitive layer is colored blue-green. However, the dyes used according to our invention may also be incorporated in sensitive layers which transmit the color of the image-forming dye. For example, the magenta dyes proposed according to our invention may be incorporated in a blue-sensitive layer or a red-sensitive layer as well as in a green-sensitive layer of a multi-layer coating.

Our dyes may be incorporated in sensitive layers coated on transparent film supports such as cellulose nitrate or cellulose acetate or on opaque supports, such as paper or cellulose esters mixed with opaque white pigments. They may be used in single layer or multi-layer coatings or in multi-layer coatings on one or both sides of a support.

In certain cases the dyes which we propose to use may be bleached in suitable alkaline bleaching solutions such as alkaline stannous chloride. The dye may be bleached in the presence of a silver salt image rather than in the presence of a silver image.

Although the specific dyes which we have described are magenta or yellow in color, dyes of these colors being used in the well known process of subtractive color photography, we are not limited to dyes of these hues as dyes of other colors may be formed by our invention for use in photographic layers.

Dyes of the structure which we have described are practically non-diffusing in gelatin and have little or no adverse effect on the sensitivity of the emulsion in which they are incorporated or on adjacent emulsion layers. They may be bleached in the presence of a silver or silver salt image as stated above and when used in filter or anti-halation layers they may be discharged by the use of sodium hydrosulfite or potassium permanganate. By forcing coupling of the tetrazotized aromatic diamine with a phenol or naphthol ortho to the hydroxyl group of the phenol or naphthol, dyes are produced which have sharper absorption spectra, that is which absorb more completely in one spectral region and less in other spectral regions.

The dyes which we have proposed have high water solubility, thus facilitating the preparation of dyed layers of adequate dye density without crystallization of the dye. In general, the dyes may contain substituent groups other than those specified above although they may not be substituted with a large number of solubilizing groups or their diffusion tendency will be increased. For example, some of the dyes might be made to diffuse by introducing an excessive number of sulfonic acid groups. This fact is well known in the dye art and we do not intend to include within the scope of our invention dyes containing an excess number of solubilizing groups which would increase the diffusion tendency. In general, dyes having two to four sulfonic acids in the molecule are sufficiently soluble and do not diffuse from gelatin. However, even with dyes containing more than four sulfonic acid groups the diffusion tendency may be reduced by various expedients such as acylation of amino groups or etherification or esterification of hydroxyl groups other than those ortho to the azo group.

It is to be understood that the specific examples included herein are illustrative only and that our invention is to be taken as limited only by the scope of the appended claims.

We claim:

1. A multi-layer photographic element including a light-sensitive gelatino-silver halide layer and a gelatin layer containing a non-diffusing dye formed by tetrazotizing a symmetrical aromatic diamine having ortho to the amino groups, substituent groups selected from the class consisting of halogen and alkyl groups and coupling it in the 1-position with a β-naphthol.

2. A multi-layer photographic element including a light-sensitive gelatino-silver halide layer and a gelatin layer containing a non-diffusing dye formed by tetrazotizing a symmetrical aromatic diamine having halogen groups ortho to the amino groups and coupling it in the 1-position with a β-naphthol.

3. A multi-layer photographic element including a light-sensitive gelatino-silver halide layer and a gelatin layer containing a non-diffusing dye formed by tetrazotizing a symmetrical aromatic diamine having alkyl groups ortho to the amino groups and coupling it in the 1-position with a β-naphthol.

4. A multi-layer photographic element including a light-sensitive gelatino-silver halide layer and a gelatin layer containing a non-diffusing dye formed by tetrazotizing a symmetrical aromatic diamine having halogen groups ortho to the amino groups and coupling it in the 1-position with β-naphthol.

5. A multi-layer photographic element including a light-sensitive gelatino-silver halide layer and a gelatin layer containing a non-diffusing dye formed by tetrazotizing a symmetrical aromatic diamine having alkyl groups ortho to the amino groups and coupling it in the 1-position with β-naphthol.

6. A multi-layer photographic element including a light-sensitive gelatino-silver halide layer and a gelatin layer containing a non-diffusing dye formed by tetrazotizing a symmetrical aromatic diamine having chlorine groups ortho to the amino groups and coupling it in the 1-position with β-naphthol.

7. A multi-layer photographic element including a light-sensitive gelatino-silver halide layer and a gelatine layer containing a non-diffusing dye formed by tetrazotizing a symmetrical aromatic diamine having methyl groups ortho to the amino groups and coupling it in the 1-position with β-naphthol.

8. A gelatino-silver halide layer for the bleach-out process of color photography uniformly colored with a non-diffusion dye formed by tetrazotizing a symmetrical aromatic diamine having halogen groups ortho to the amino groups and coupling it in the 1-position with a β-naphthol.

9. A gelatino-silver halide layer for the bleach-out process of color photography uniformly colored with a non-diffusing dye formed by tetrazotizing a symmetrical aromatic diamine having alkyl groups ortho to the amino groups and coupling it in the 1-position with a β-naphthol.

10. A multi-layer element for color photography having at least one gelatino-silver halide layer which is uniformly colored with a dye formed by coupling a tetrazotized symmetrical aromatic diamine having halogen groups ortho to the amino groups, with a β-naphthol.

11. A multi-layer element for color photography having at least one gelatino-silver halide layer which is uniformly colored with a dye formed by coupling a tetrazotized symmetrical aromatic diamine having alkyl groups ortho to the amino groups with a β-naphthol.

12. A multi-layer element for color photography having at least one gelatino-silver halide layer which is uniformly colored with a non-diffusing dye formed by tetrazotizing a symmetrical aromatic diamine having ortho to the amino groups, substituent groups selected from the class consisting of halogen and alkyl groups, and coupling it in the 1-position with a β-naphthol.

BURT H. CARROLL.
JONAS JOHN CHECHAK.